US005861850A

United States Patent [19]

Robertson, Jr. et al.

[11] Patent Number: 5,861,850

[45] Date of Patent: Jan. 19, 1999

[54] ANTENNA ASSEMBLY FOR USE WITH A PORTABLE TWO-WAY COMMUNICATIONS DEVICE AND METHOD OF USING SAME

[75] Inventors: William H. Robertson, Jr., Plantation; David Clark Everest, III, Tamarac; Robert Leon, Miami, all of Fla.

[73] Assignee: Motorola, Inc., Schaumburg, Ill.

[21] Appl. No.: 762,086

[22] Filed: Dec. 9, 1996

[51] Int. Cl.[6] .............................. H01Q 1/24; H01Q 1/36; H04B 1/38; H04B 1/08

[52] U.S. Cl. ............................ 343/702; 343/895; 455/90; 455/347; 455/351

[58] Field of Search ..................................... 343/702, 895; 455/90, 347, 351

[56] References Cited

U.S. PATENT DOCUMENTS

| | | | |
|---|---|---|---|
| 4,126,863 | 11/1978 | Kolwaite | 343/702 |
| 4,286,335 | 8/1981 | Eichler et al. | 343/702 |
| 4,644,366 | 2/1987 | Scholz | 343/702 |
| 4,650,933 | 3/1987 | Banda et al. | 379/21 |
| 4,740,790 | 4/1988 | Phillips et al. | 343/702 |
| 5,079,559 | 1/1992 | Umetsu et al. | 343/702 |
| 5,650,790 | 7/1997 | Fukuchi et al. | 343/702 |
| 5,722,055 | 2/1998 | Kobayashi et al. | 455/90 |

*Primary Examiner*—Anita Pellman Gross
*Assistant Examiner*—Daniel St. Cyr
*Attorney, Agent, or Firm*—Frank M. Scutch, III

[57] ABSTRACT

An antenna assembly (100) for use in a portable two-way radio communications device includes a radio housing (101) including one or more boss (103) used for securing portions of a substrate (105) to the radio housing. An aperture (115) located within an antenna housing (111) is positioned over an antenna boss (107) where a metal trace located on the substrate (105) can be electrically connected to the antenna housing (111) using a fastener (109). The antenna assembly (100) permits an antenna element (113) located in the antenna housing (111) to be easily connected to the substrate (105) using minimal component parts while fastening both the antenna housing (111) and substrate (105) into a fixed position.

19 Claims, 3 Drawing Sheets

ANTENNA ASSEMBLY FOR USE WITH A PORTABLE TWO-WAY COMMUNICATIONS DEVICE AND METHOD OF USING SAME

TECHNICAL FIELD

This invention relates in general to antennas and more particularly antenna assemblies used with two-way portable radios.

BACKGROUND

The new family radio service (FRS) is a portion of radio spectrum allotted by the Federal Communications Commission (FCC) and is intended to be used for narrow band frequency modulation (FM) two-way radio communication. The allotted frequencies in the FRS allowing average consumers buying the appropriate two-way radio products to operate license free within this band. Consequently, this readily allows a consumer to purchase two or more FRS radios that can be easily used in various operating environments and conditions such during vacations, sporting events and/or emergencies.

While offering license free operation, the FCC has also mandated certain requirements for two-way radio manufacturers producing radio products for the FRS. Thus, this regulatory mandate had imposed requirements that were previously unnecessary on other consumer or industrial type two-way radio products. One such requirement pertains to the antenna used on the FRS two-way radio. Among other things, this requirement specifies that the antenna shall be incapable of being removed or changed by the operator. Therefore, in view of this new regulation, a novel and unique antenna attachment structure will be required. As is well know in the art, other commercially available two-way radio products most often include a removable antenna, generally with some type of threaded or twist-on attachment.

Additional considerations for the radio manufacturer also include low cost and ease of assembly. For low price consumer products made for the FRS, it is important to maintain low material and manufacturing costs. With this in mind, a number of antenna performance considerations are also at issue. Specifically, there are additional regulatory requirements pertaining to the maximum effective radiated power (ERP) of the FRS two-way radio. These requirement specify that the ERP will not exceed one-half watt. This requires the antenna gain of the FRS antenna be very efficient while permitting only minimum current drain by the transmitter on the on-board batteries. Moreover, two way radio antennas typically can be lossy in the ultra high frequency (UHF) range since they are often required to meet very stringent mechanical requirements. In general, these antennas will have no better than −6 dBi to −8 dBi gain.

For these reasons, there is a need for a new antenna assembly the can be used with FRS radios and other consumer two-way radio products that is not removable yet is easily to manufacture and assemble.

DETAILED DESCRIPTION OF THE PREFERRED EMBODIMENT

Figure 1:
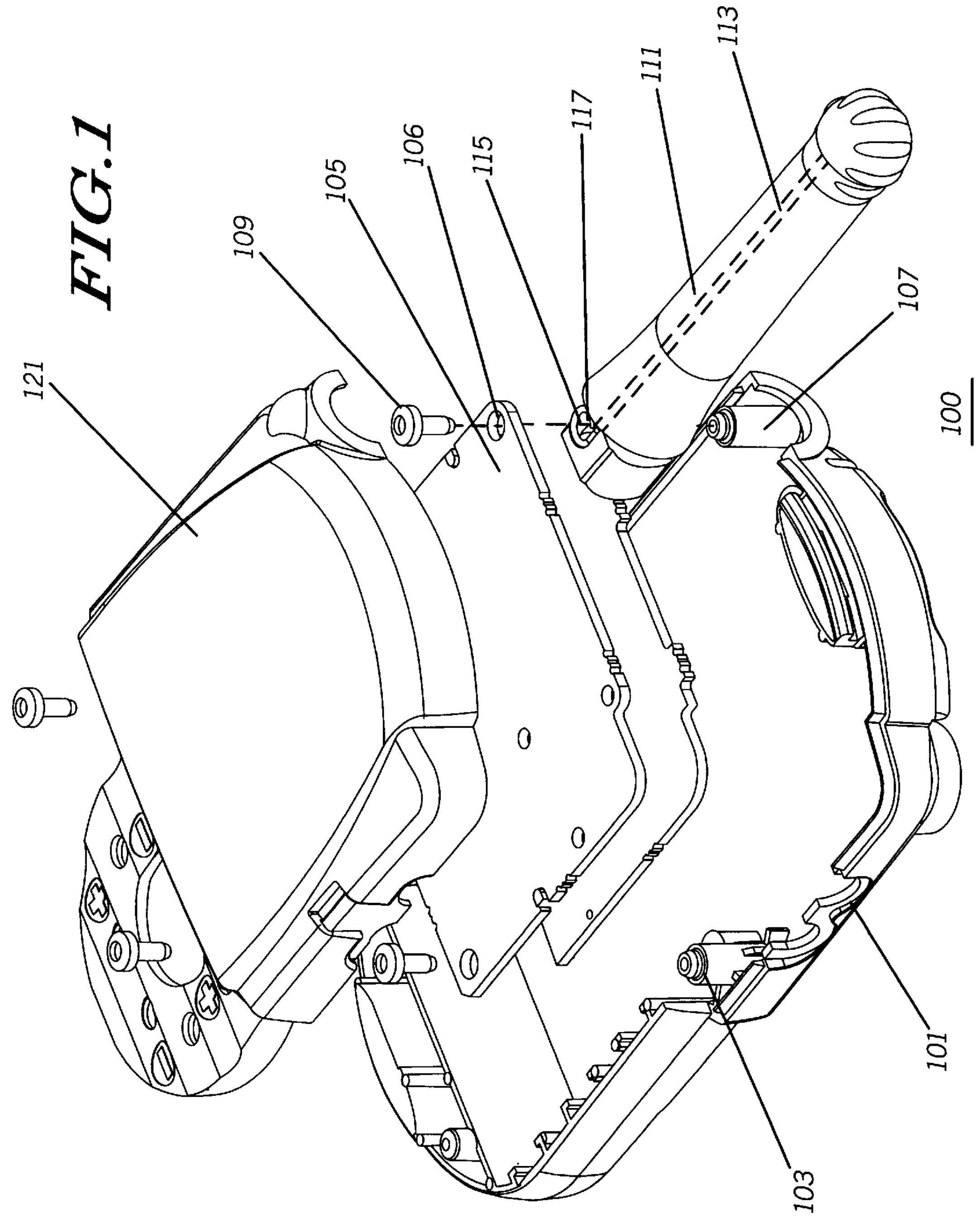
FIG. 1 is an exploded view of the antenna assembly used in accordance with the preferred embodiment of the invention.
Figure 2:
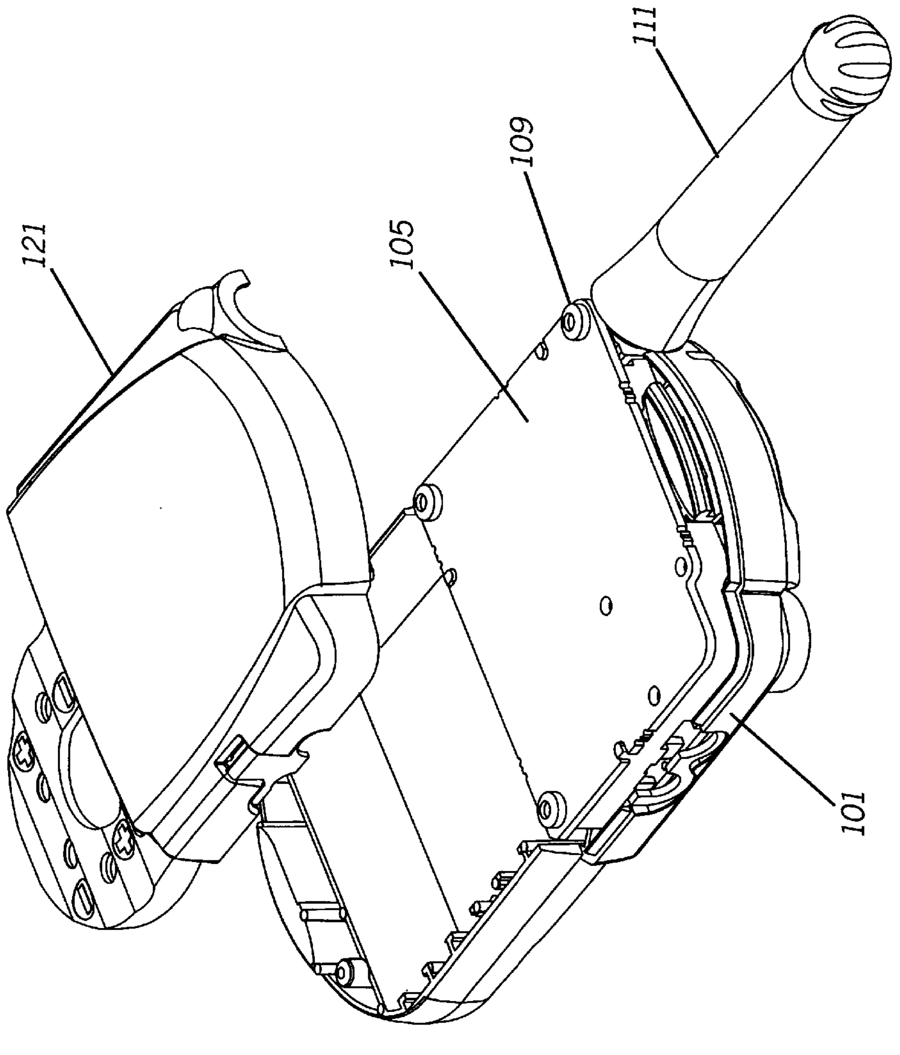
FIG. 2 is an isometric view of that shown in FIG. 1, where the antenna assembly is in a partially assembled condition.

Referring now to FIGS. 1 and 2, an antenna assembly 100 for use in a two-way portable communications device includes a front housing 101 having one or more boss 103. The boss 103 is a substantially tapped hollow cylindrical shaft that protrudes upwardly from an inside surface of the front housing 101. The boss 103 is used for securing and/or supporting one or more sections of substrate 105. As best seen in FIG. 2, the substrate 105 is secured to each boss 103 using a plurality of fasteners 109. As will be recognized by those skilled in the art, substrate 105 is manufactured out of fire-retarding epoxy resin/glass cloth laminate (FR-4), but other compounds such as bismaleimide/triazine (BT) or polyimide may also be used.

Among the boss 103, an antenna boss 107 is used to rigidly secure an antenna shroud or housing 111. As seen in FIG. 1, the antenna housing 111 encloses and protects an antenna element 113 (shown in phantom) located within the housing. The antenna element 113 is made of a conductor such as copper or the like generally forming a helical type coil. The antenna element 113 is used to radiate radio frequency (RF) energy produced by the transmitter within the two-way portable communications device.

Figure 3:
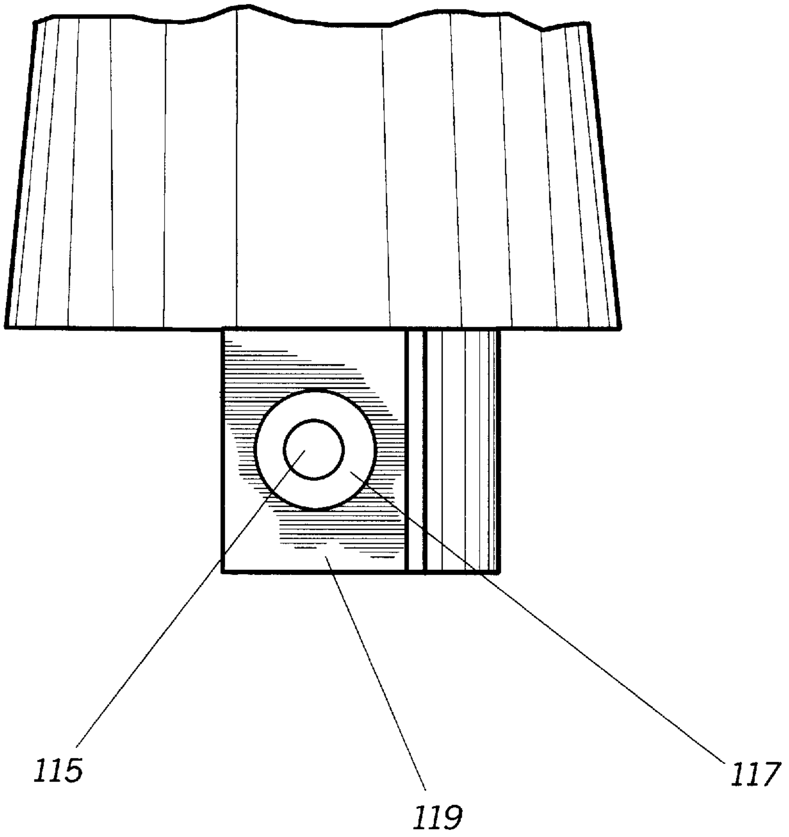
FIG. 3 is a front view of the lower section of the antenna housing used in the present invention.

As seen in FIGS. 1 and 3, the antenna boss 107 extends upwardly through a portion of an aperture 115 located at the lower section of the antenna housing 111. A plated recess section 117, extending about the perimeter of the aperture 115, is electrically connected to the antenna element 113 located with the antenna housing 111.

Hence, during assembly, the aperture 115 in the antenna housing 111 is positioned onto the antenna boss 107. The aperture 115 in the antenna housing 111 is appropriately sized to prevent circular movement of the antenna housing 111 around the antenna boss 107. A substrate aperture 106, substantially located at a corner of the substrate 105, is placed on a flat section 119 of the antenna housing 111. The substrate aperture 106 is appropriately sized to accommodate the fastener 109. A metal runner or trace (not shown) located on the substrate 105 near the substrate aperture 106 is then used to make electrical connection with the plated recess section 117. The plated recess section 117 is recessed so as to allow the substrate 105 to lay substantially flat on the flat section 119.

Thereafter, the shaft and head of each fastener 109 is used to engage in each respective boss 103 and the antenna boss 107 to securely hold the substrate 105 and antenna housing 111 into a fixed position. The fasteners 109 are manufactured out of an insulative material or alternatively from a conductive material to aid in the electrical connection between a metal trace and plated recess section 117.

As will be apparent to those skilled in the art, no external wires or wire flexes need be used to electrically connect the antenna element 113 to circuits or components on the substrate 105. A quick assembly with mechanical and electrical connection can be accomplished using few mechanical components. After the antenna assembly is complete, clips located on the rear housing 121 are used to engage within the front housing 101 for enclosing the substrate 105 and other internal components in a unitary two-way portable communications device.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An antenna assembly for use in a portable two-way radio communications device comprising:

a radio housing including at least one boss;

an antenna housing including at least one aperture for receiving the at least one boss to hold the antenna housing into a fixed position; wherein the antenna is positioned to receive the at least one boss;

a substrate; and at least one fastener for securing the antenna housing between the substrate and the boss.

2. An antenna assembly as in claim 1 wherein the at least one fastener mechanically connects with the at least one boss through the at least one aperture for electrically connecting an antenna element in the antenna housing with the substrate.

3. An antenna assembly as in claim 1 wherein the antenna housing includes at least one plated recess located about the at least one aperture for connecting the substrate with an antenna element.

4. An antenna assembly as in claim 3 wherein the at least one plated recess is substantially circular for fascinating contact with a conductive trace on the substrate.

5. An antenna assembly as in claim 3 wherein the substrate includes at least one conductive trace for connecting electrical components with the antenna element.

6. An antenna assembly as in claim 1 wherein the at least one fastener is made of an insulative material.

7. An antenna assembly as in claim 1 wherein the at least one fastener is made of a conductive material.

8. A two-way portable radio having an antenna assembly comprising:

a boss attached to a two-way radio housing;

an antenna shroud for housing at least one antenna element;

an electrical recess connection located on the antenna shroud;

at least one substrate for use with electrical components; and at least one fastener for engaging the boss through the electrical recess connection to electrically attach the at least one antenna element with the at least one substrate, wherein the antenna is positioned to receive the boss to hold the antenna in a fixed position.

9. A two-way portable radio as in claim 8 wherein the antenna shroud is an insulator.

10. A two-way portable radio as in claim 8 wherein the at least one substrate includes a plurality of metal traces for interconnecting electrical components.

11. A two-way portable radio as in claim 10 wherein at least one of the plurality of metal traces is electrically connected to the at least one antenna element using the at least one fastener.

12. A two-way portable radio as in claim 8 wherein the at least one fastener is made of an insulative material.

13. A two-way portable radio as in claim 8 wherein the at least one fastener is made of a conductive material.

14. A two-way portable radio as in claim 8 wherein the electrical recess connection is comprised of a conductive plate positioned about an aperture and attached to the at least one antenna element.

15. A method for attaching an electrical substrate to an antenna element in a two-way portable communications device comprising the steps of:

providing a radio housing including at least one boss;

positioning an antenna shroud having an electrically conductive aperture connected to the antenna element over the at least one boss;

positioning a substrate having at least one aperture and at least one conductive runner over the antenna shroud;

placing a fastener through the electrically conductive aperture and the at least one aperture in the substrate; and engaging the at least one boss with the fastener for electrically connecting the at least one conductive runner with the electrically conductive aperture and for holding the substrate and antenna shroud into a fixed position, wherein the antenna is positioned to receive the boss.

16. A method as in claim 15 further including the steps of:

positioning the at least one boss through the electrically conductive aperture; and electrically connecting the fastener with the at least one conductive runner and the electrically conductive aperture.

17. A method as in claim 15 wherein the substrate is a printed circuit board.

18. A method as in claim 15 wherein the fastener is made of an insulative material.

19. A method as in claim 15 wherein the fastener is a conductive screw.

* * * * *